(12) United States Patent
Tamura et al.

(10) Patent No.: US 12,723,315 B2
(45) Date of Patent: Sep. 1, 2026

(54) AMMONIA MANUFACTURING APPARATUS AND AMMONIA MANUFACTURING METHOD

(71) Applicants: KABUSHIKI KAISHA TOSHIBA, Tokyo (JP); The University of Tokyo, Tokyo (JP)

(72) Inventors: Jun Tamura, Tokyo (JP); Ryota Kitagawa, Tokyo (JP); Koji Mizuguchi, Kawasaki (JP); Yoshitsune Sugano, Kawasaki (JP); Yoshiaki Nishibayashi, Tokyo (JP); Kazuya Arashiba, Tokyo (JP)

(73) Assignees: KABUSHIKI KAISHA TOSHIBA;, Tokyo (JP); THE UNIVERSITY OF TOKYO, Tokyo (JP)

( * ) Notice: Subject to any disclaimer, the term of this patent is extended or adjusted under 35 U.S.C. 154(b) by 748 days.

(21) Appl. No.: 18/184,881

(22) Filed: Mar. 16, 2023

(65) Prior Publication Data

US 2024/0110293 A1 Apr. 4, 2024

(30) Foreign Application Priority Data

Sep. 15, 2022 (JP) ................................ 2022-147413

(51) Int. Cl.
*C25B 1/27* (2021.01)
*B01J 23/28* (2006.01)
(Continued)

(52) U.S. Cl.
CPC ................ *C25B 1/27* (2021.01); *B01J 23/28* (2013.01); *B01J 31/18* (2013.01); *C01C 1/0458* (2013.01);
(Continued)

(58) Field of Classification Search
None
See application file for complete search history.

(56) References Cited

U.S. PATENT DOCUMENTS 11,110,433 B2 9/2021 Peng et al.
2016/0083853 A1 3/2016 Botte
(Continued)

FOREIGN PATENT DOCUMENTS

JP 2001-278607 A 10/2001
JP 2019-511448 A 4/2019
(Continued)

OTHER PUBLICATIONS

Liu et al., Facile Ammonia Synthesis from Electrocatalytic N2 Reduction under Ambient Conditions on N-Doped Porous Carbon, ACS Catalysis, vol. 8, No. 2, Jan. 2018, pp. 1186-1191 (Year: 2018).*

(Continued)

*Primary Examiner* — Harry D Wilkins, III
(74) *Attorney, Agent, or Firm* — Foley & Lardner LLP

(57) ABSTRACT

An ammonia manufacturing apparatus of an embodiment includes: an electrochemical reaction cell including: a first reaction tank in which a reduction electrode is arranged and gaseous nitrogen is supplied; a second reaction tank in which an oxidation electrode is arranged and an electrolytic solution containing water or water vapor is supplied; and a diaphragm provided between the first reaction tank and the second reaction tank. In the ammonia manufacturing apparatus of the embodiment, the reduction electrode includes a reduction catalyst that reduces nitrogen to produce ammonia, a porous carbon material that supports the reduction catalyst, and an organic polymer material that binds the
(Continued)

porous carbon material. The porous carbon material has pores with a BET average pore size of 1 nm or more and 15 nm or less.

12 Claims, 3 Drawing Sheets

(51) Int. Cl.

| | |
|---|---|
| ***B01J 31/18*** | (2006.01) |
| ***C01C 1/04*** | (2006.01) |
| ***C25B 1/50*** | (2021.01) |
| ***C25B 9/19*** | (2021.01) |
| ***C25B 9/70*** | (2021.01) |
| ***C25B 11/031*** | (2021.01) |

(52) U.S. Cl.

CPC .................. *C25B 1/50* (2021.01); *C25B 9/19* (2021.01); *C25B 9/70* (2021.01); *C25B 11/031* (2021.01); *B01J 2231/62* (2013.01); *B01J 2531/64* (2013.01)

(56) References Cited

U.S. PATENT DOCUMENTS

| | | | |
|---|---|---|---|
| 2021/0395902 | A1 | 12/2021 | Tamura et al. |
| 2023/0002917 | A1 | 1/2023 | Nishibayashi et al. |
| 2023/0295813 | A1 | 9/2023 | Kondo et al. |
| 2023/0295818 | A1 | 9/2023 | Nishibayashi et al. |

FOREIGN PATENT DOCUMENTS

| | | | | |
|---|---|---|---|---|
| JP | 2021-095640 A1 | 6/2021 | | |
| JP | 2021-175817 A | 11/2021 | | |
| WO | WO-2019/168093 A1 | 9/2019 | | |
| WO | WO-2021/045206 A1 | 3/2021 | | |
| WO | WO-2021124616 A1 * | 6/2021 | .......... | B01J 31/2409 |
| WO | WO-2022/034927 A1 | 2/2022 | | |
| WO | WO-2022/034928 A1 | 2/2022 | | |
| WO | WO-2022056427 A1 * | 3/2022 | ............... | C25B 1/27 |

OTHER PUBLICATIONS

Liu et al., Supporting Information for Facile Ammonia Synthesis from Electrocatalytic N2 Reduction under Ambient Conditions on N-Doped Porous Carbon, Jan. 2018, pp. S1-S10 (Year: 2018).*

Song et al., Electrochemical nitrogen reduction to ammonia at ambient conditions on nitrogen and phosphorus co-doped porous carbon, Chemical Communications, vol. 55, No. 5, Dec. 2018, pp. 687-690 (Year: 2018).*

Wang et al., Synthesis of Mesoporous FeN/C Materials with High Catalytic Performance in the Oxygen Reduction Reaction, Chem CatChem, vol. 7, No. 18, Sep. 2015, pp. 2937-2944 (Year: 2015).*

Aya Eizawa et al., "Remarkable catalytic activity of dinitrogen-bridged dimolybdenum complexes bearing NHC-based PCP-pincer ligands toward nitrogen fixation", Nature Communications, Apr. 4, 2017, 8:14874, pp. 1-12, DOI: 10.1038/ncomms 14874 (12 pages).

Kazuya Arashiba et al., "Catalytic Ammonia Formation with Electrochemically Reduced Samarium Diiodide from Samarium Triiodide and Water from Dinitrogen", Chemistry Letters, 2021, pp. 1-5 (6 pages).

Yuya Ashida et al., "Molybdenum-catalysed ammonia production with samarium diiodide and alcohols or water", Nature, Apr. 25, 2019, pp. 536-551, vol. 568 (16 pages).

AU Office Action for AU Appl. Ser. No. 2023201532 dated Mar. 4, 2024 (12 pages).

Chen et al., "Electrocatalytic Synthesis of Ammonia at Room Temperature and Atmospheric Pressure from Water and Nitrogen on a Carbon-Nanotube-Based Electrocatalyst," Angewandte Chemie International Edition, 2017, vol. 56 (pp. 2699-2703).

European Search Report for Appl. Ser. No. EP 23162041 dated Sep. 17, 2024 (7 pages).

Nishi et al., "Energy Efficient and Intermittently Variable Ammonia Synthesis over Mesoporous Carbon-Supported Cs—Ru Nanocatalysts," Catalysts, Apr. 30, 2019, vol. 9, No. 406 (pp. 1-21).

JP Office Action for JP Appl. Ser. No. 2022-147413 dated Oct. 21, 2025 (6 pages).

* cited by examiner

1
$NH_3$
10
$O_2$
21
24
13
20
$NH_3/H_2O$
11
$NH_3/O_2/H_2O$
12
3
22
23
5
4
6
$NH_3/H_2/N_2$
2
$N_2/H_2O$
18
$N_2/O_2$
7
$NH_3/H_2O$
9
$H_2/N_2$
8
$H_2O$
$NH_3$
19

AMMONIA MANUFACTURING APPARATUS AND AMMONIA MANUFACTURING METHOD

CROSS-REFERENCE TO RELATED APPLICATION

This application is based upon and claims the benefit of priority from Japanese Patent Application No. 2022-147413, filed on Sep. 15, 2022; the entire contents of which are incorporated herein by reference.

FIELD

Embodiments disclosed herein relate generally to an ammonia manufacturing apparatus and an ammonia manufacturing method.

BACKGROUND

The amount of production of ammonia is about 140 million tons in the world in a year and continues to rise. About 80% of the amount of production is utilized as a raw material for fertilizer and is mainly converted to other nitrogen compounds such as urea, nitric acid, ammonium nitrate, and ammonium sulfate. On the other hand, the remaining 20% thereof is utilized for manufacture of synthetic resin and fiber. To cope with the global population growth, the shortage of cultivated acreage, and the food shortages due to the sophistication of diet mainly in developing countries, an increase in demand for ammonia is inevitable. Besides, ammonia attracts attention when used as an energy carrier owing to its ease of handling, high energy density, and a characteristic of containing no carbon and emitting no carbon dioxide when used.

At present, ammonia is industrially synthesized from hydrogen gas and nitrogen gas derived from fossil fuels such as petroleum, coal, or natural gas by the method called the Haber-Bosh process invented about 100 years ago. This synthesis reaction requires severe conditions such as high temperature (400 to 650° C.) and high pressure (200 to 400 atm), consumes 1.2% of total energy in the world, and emits a large amount of carbon dioxide. To form a sustainable society in the future, the development of an alternative synthesis process for ammonia with low dependence on fossil fuels is expected.

Regarding the above point, a catalyst for producing ammonia from nitrogen at normal temperature and pressure is under development. For example, it has been reported that a molybdenum iodide complex having a PNP (2,6-bis(di-tert-butylphosphinomethyl)pyridine) ligand as a catalyst, alcohol or water as a proton source, and a solution containing a halide (II) of a lanthanoid metal, for example, samarium (II) iodide as a reducing agent are stirred in the presence of nitrogen gas at normal temperature to thereby produce up to 4350 equivalents of ammonia per catalyst. In addition, the method using the molybdenum iodide complex with the PNP ligand as the catalyst and using a solution used in a cathode tank or both an electrolyte membrane and the solution used in the cathode tank as the proton source has been reported.

However, the production reaction of ammonia needs to use a stoichiometric amount of expensive samarium (II) iodide for the reducing agent. Further, the reaction can be controlled only within the amount of the reducing agent. Therefore, from an industrial standpoint, there is a need for a manufacturing method that allows control of the reaction at a low cost, and can efficiently produce and recover ammonia. It is desirable to develop an ammonia manufacturing apparatus and manufacturing method that can manufacture ammonia with high efficiency and efficiently recover the manufactured ammonia.

DETAILED DESCRIPTION

An ammonia manufacturing apparatus of an embodiment includes: an electrochemical reaction cell including a first reaction tank in which a reduction electrode is arranged and gaseous nitrogen is supplied; a second reaction tank in which an oxidation electrode is arranged and an electrolytic solution containing water or water vapor is supplied, and a diaphragm provided between the first reaction tank and the second reaction tank. In the ammonia manufacturing apparatus of the embodiment, the reduction electrode includes a reduction catalyst that reduces nitrogen to produce ammonia, a porous carbon material that supports the reduction catalyst, and an organic polymer material that binds the porous carbon material. The porous carbon material has pores with a BET average pore size of 1 nm or more and 15 nm or less.

Hereinafter, an ammonia manufacturing apparatus and an ammonia manufacturing method of embodiments will be described with reference to the drawings. In the embodiments described below, substantially the same components are denoted by the same reference signs and a description thereof may be partly omitted. The drawings are schematic, and a relation between the thickness and the planar dimension, a thickness ratio among the components, and so on may be different from actual ones.

Figure 1:
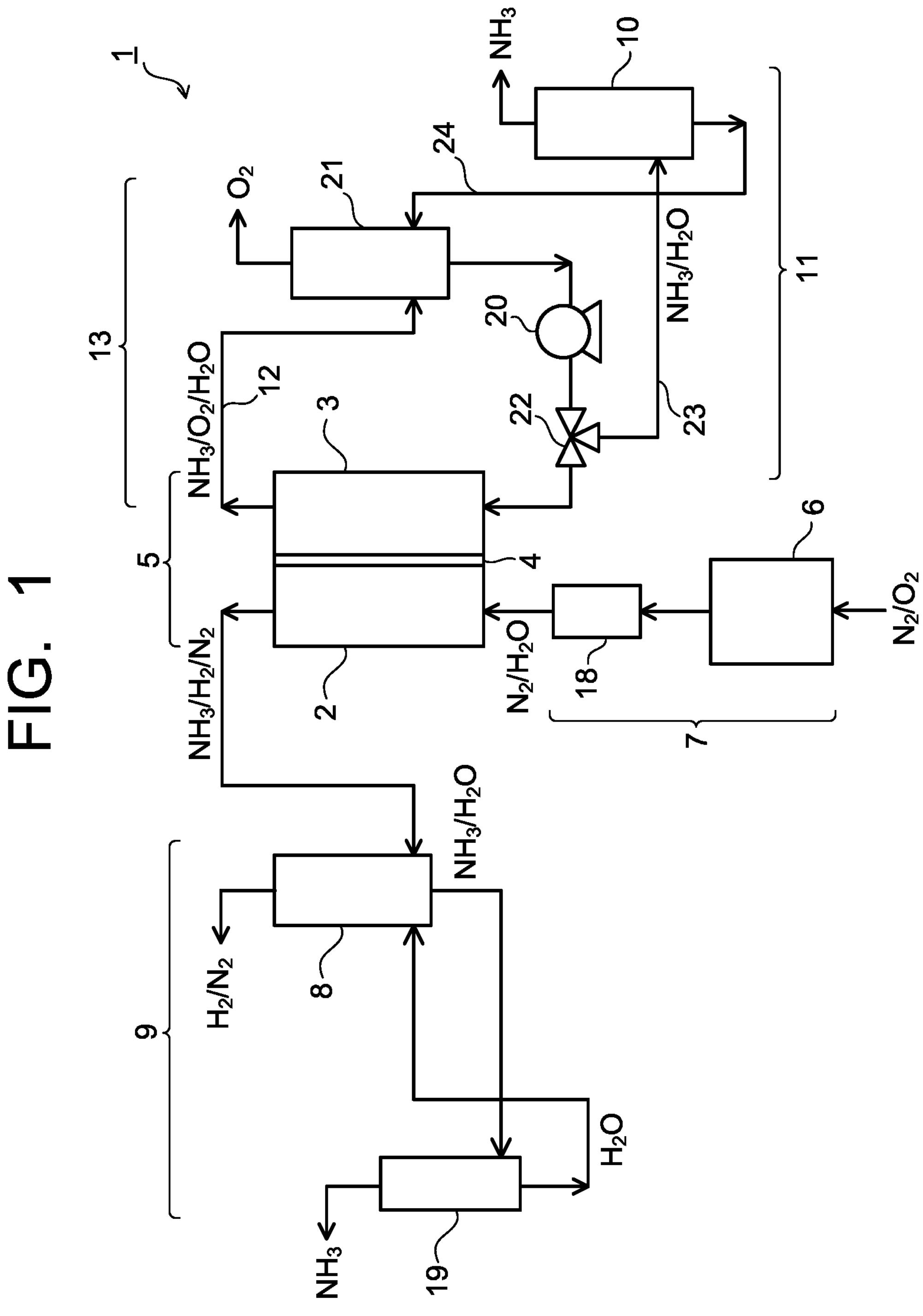
FIG. 1 is a view illustrating an ammonia manufacturing apparatus of an embodiment.

FIG. 1 is a view illustrating an ammonia manufacturing apparatus 1 of an embodiment. The ammonia manufacturing apparatus 1 illustrated in FIG. 1 includes: an electrochemical reaction unit (electrolysis cell) 5 including a first reaction tank (reduction reaction electrolytic bath) 2 to which gaseous nitrogen is supplied, a second reaction tank (oxidation reaction electrolytic bath) 3 to which an electrolytic solution containing water or water vapor is supplied, and a diaphragm 4; a nitrogen supply unit 7 including a nitrogen supply part (supplier) 6 for supplying nitrogen to the first reaction tank 2; an ammonia collection unit 9 including a collection part (collector) 8 for collecting ammonia contained in the gas exhausted from the first reaction tank 2, and an ammonia separation unit 11 including an ammonia separation part (separator) 10 for separating ammonia contained in the electrolytic solution discharged from the second reaction tank 3. The ammonia manufacturing apparatus 1 further includes an electrolytic solution circulation unit 13 including a circulation pipe 12 for circulating the electrolytic solution accommodated in the second reaction tank 3 outside the second reaction tank 3. Hereinafter, each component will be described in detail.

Figure 2:
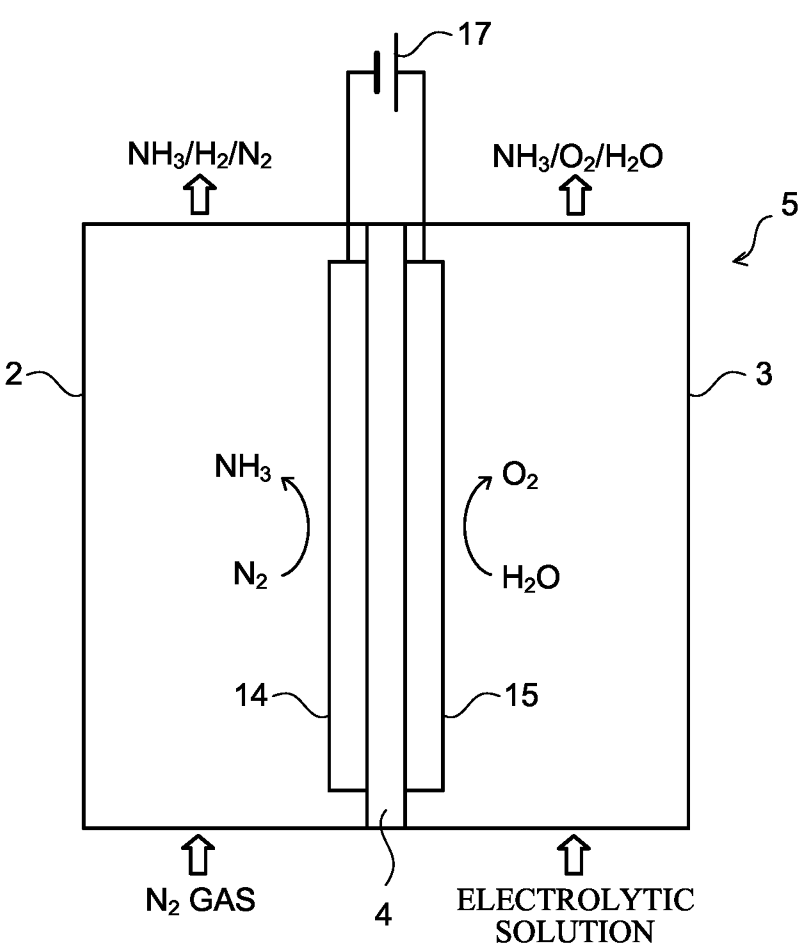
FIG. 2 is a view illustrating a first example of an electrochemical reaction unit of the ammonia manufacturing apparatus illustrated in FIG. 1.

FIG. 2 illustrates a first example of the electrochemical reaction unit 5. The electrochemical reaction unit 5 illustrated in FIG. 2 includes the first reaction tank (reduction reaction electrolytic bath) 2, the second reaction tank (oxidation reaction electrolytic bath) 3, the diaphragm 4 provided between the first reaction tank 2 and the second reaction tank 3, a reduction electrode 14 arranged in the first reaction tank 2 and used for an electrochemical reduction reaction, and an oxidation electrode 15 arranged in the second reaction tank 3 and used for an electrochemical oxidation reaction, and these constitute an electrochemical reaction cell (electrolysis cell). The electrochemical reaction cell 5 is partitioned into the first reaction tank 2 and the second reaction tank 3 by the diaphragm 4 capable of moving ions such as hydrogen ions ($H^+$) and hydroxide ions ($OH^-$). Gaseous nitrogen ($N_2$) is supplied to the first reaction tank 2 through a pipe. In the second reaction tank 3, the electrolytic solution containing water ($H_2O$) or water vapor ($H_2O$) is supplied through the circulation pipe 12.

Figure 3:
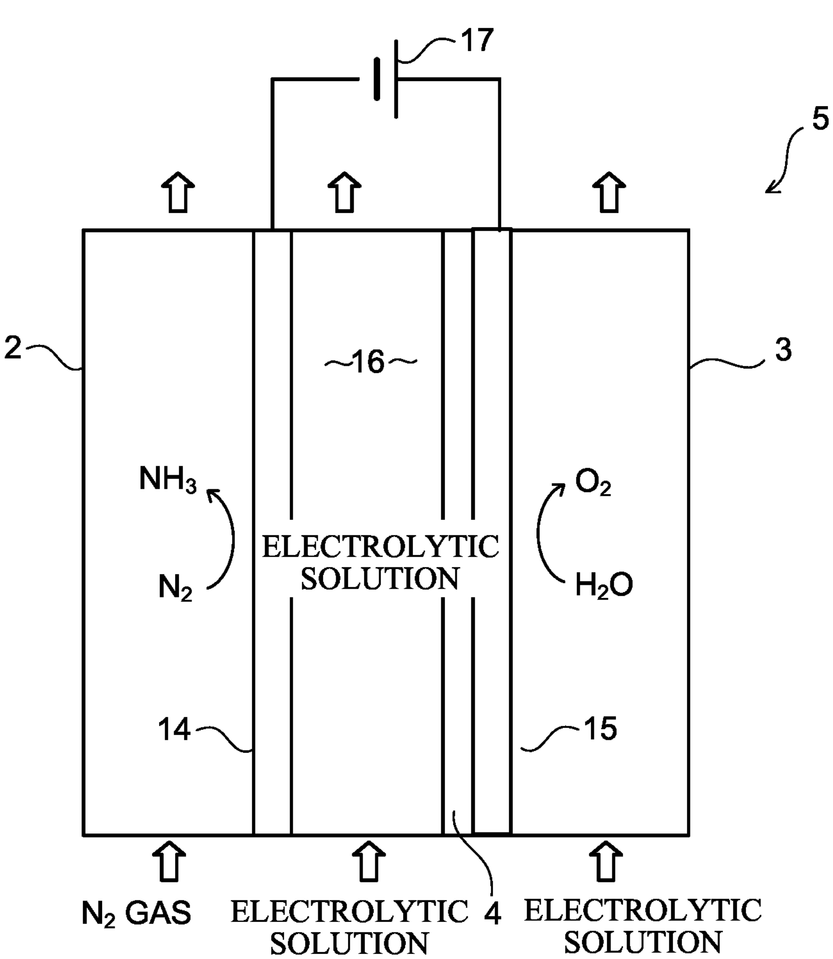
FIG. 3 is a view illustrating a second example of the electrochemical reaction unit of the ammonia manufacturing apparatus illustrated in FIG. 1.

The electrochemical reaction unit 5 may have the configuration illustrated in FIG. 3. FIG. 3 illustrates a second example of the electrochemical reaction unit 5. The electrochemical reaction unit 5 illustrated in FIG. 3 includes a third reaction tank 16, to which an electrolytic solution (cathode solution) containing water is supplied, provided between the first reaction tank 2, to which gaseous nitrogen ($N_2$) is supplied, and the diaphragm 4. The first reaction tank 2 and the third reaction tank 16 are in contact with each other through the reduction electrode 14 in a porous state, and they form a cathode chamber. The cathode chamber with the first reaction tank 2 and the third reaction tank 16 is in contact with the second reaction tank 3 as an anode chamber through the diaphragm 4 and the oxidation electrode 15 in a porous state. According to the electrochemical reaction unit 5 illustrated in FIG. 3, ammonia ($NH_3$) produced by reducing gaseous nitrogen ($N_2$) supplied to the first reaction tank 2 can be dissolved in the electrolytic solution (cathode solution) supplied to the third reaction tank 16 and taken from the electrochemical reaction cell (electrolysis cell) 5 to the outside. This makes it possible to increase efficiency of ammonia recovery.

The reduction electrode 14 and the oxidation electrode 15 are connected to an external electrode 17. By supplying electric power from the external electrode 17 to the reduction electrode 14 and the oxidation electrode 15, a reduction reaction occurs at the reduction electrode 14 and an oxidation reaction occurs at the oxidation electrode 15. In the second reaction tank 3, for example, water ($H_2O$) in the electrolytic solution is oxidized at the oxidation electrode 15 to produce oxygen ($O_2$), hydrogen ions ($H^+$), and electrons (e). The produced oxygen is discharged together with water from the second reaction tank 3 through the circulation pipe 12. In the first reaction tank 2, nitrogen ($N_2$) is reduced by an ammonia-producing catalyst to produce ammonia ($NH_3$). Nitrogen-containing ammonia is derived to the outside of the first reaction tank 2 through a pipe and is sent continuously to the ammonia collection unit 9. Part of the ammonia produced in the first reaction tank 2 passes through the diaphragm 4 and moves to the second reaction tank 3. The electrolytic solution containing water or water vapor mixed with ammonia in the second reaction tank 3 is derived to the outside of the second reaction tank 3 through the circulation pipe 12 and sent continuously or intermittently to the ammonia separation unit 11.

The second reaction tank 3 is supplied with the electrolytic solution containing water ($H_2O$) or water vapor as described above. The electrolytic solution may be an aqueous solution containing an electrolyte or the like. The electrolytic solution preferably has high ion conductivity and has the electrolyte itself being unreactive. Examples of the electrolyte contained in the electrolytic solution include lithium hydroxide (LiOH), sodium hydroxide (NaOH), potassium hydroxide (KOH), lithium chloride (LiCl), sodium chloride (NaCl), potassium chloride (KCl), lithium bromide (LiBr), sodium bromide (NaBr), potassium bromide (KBr), lithium iodide (LiI), sodium iodide (NaI), potassium iodide (KI), lithium nitrate ($LiNO_3$), sodium nitrate ($NaNO_3$), potassium nitrate ($KNO_3$), lithium sulfate ($Li_2SO_4$), sodium sulfate ($Na_2SO_4$), potassium sulfate ($K_2SO_4$), lithium hydrogen sulfate ($LiHSO_4$), sodium hydrogen sulfate ($NaHSO_4$), potassium hydrogen sulfate ($KHSO_4$), lithium peroxodisulfate ($Li_2S_2O_8$), sodium peroxodisulfate ($Na_2S_2O_8$), potassium peroxodisulfate ($K_2S_2O_8$), lithium phosphate ($Li_3PO_4$), sodium phosphate ($Na_3PO_4$), potassium phosphate ($K_3PO_4$), dilithium hydrogen phosphate ($Li_2PO_4$), disodium hydrogen phosphate ($Na_2HPO_4$), dipotassium hydrogen phosphate ($K_2HAPO_4$), lithium dihydrogen phosphate ($LiH_2PO_4$), sodium dihydrogen phosphate ($NaH_2PO_4$), potassium dihydrogen phosphate ($KH_2PO_4$), lithium hydrogen carbonate ($LiHCO_3$), sodium hydrogen carbonate ($NaHCO_3$), potassium hydrogen carbonate ($KHCO_3$), lithium carbonate ($Li_2CO_3$), sodium carbonate ($Na_2CO_3$), potassium carbonate ($K_2CO_3$), lithium tetraborate ($Li_2B_4O_7$), sodium tetraborate ($Na_2B_4O_7$), potassium tetraborate ($K_2B_4O_7$), ionic liquids, and so on. It is preferable to use water as a solvent. An electrolyte concentration in the electrolytic solution is preferably in a range of, for example, 0.001 mol/L or more and 1 mol/L or less. Furthermore, the pH of the electrolytic solution accommodated in the second reaction tank is preferably larger than 7 and 14 or less, as this is advantageous for increasing the amount of ammonia produced and the efficiency of recovery.

As cations in the ionic liquid, ions such as an imidazolium ion, a pyridinium ion, a pyrrolidinium ion, and a piperidinium ion are used. Examples of the imidazolium ion include 1-ethyl-3-methyl imidazolium, 1-methyl-3-propylimidazolium, 1-butyl-3-methylimidazole, 1-methyl-3-pentylimidazolium, 1-hexyl-3-methylimidazolium, and so on. The 2-positions of these imidazolium ions may be substituted. Examples thereof include 1-ethyl-2,3-dimethyl imidazolium, 1,2-dimethyl-3-propylimidazolium, 1-butyl-2,3-dimethylimidazolium, 1,2-dimethyl-3-pentylimidazolium, 1-hexyl-2,3-dimethylimidazolium, and so on. Examples of the pyridinium ion include methylpyridinium, ethylpyridinium, propylpyridinium, butylpyridinium, pentylpyridinium, hexylpyridinium, and so on. Examples of the pyrrolidinium ion include ethyl-methylpyrrolidinium, methylpropylpyrrolidinium, butyl-methylpyrrolidinium, methylpentylpyrrolidinium, hexyl-methylpyrrolidinium, and so on. Examples of the piperidinium ion include ethyl-methylpiperidinium, methyl-propylpiperidinium, butyl-methylpiperidinium, methyl-pentylpiperidinium, hexyl-methylpiperidinium, and so on. In the imidazolium, pyridinium, pyrrolidinium, and piperidinium ions, an alkyl group may be substituted and an unsaturated bond may exist. The cation of the ionic liquid can be a single or a combination of several cations.

Examples of anions in the ionic liquid include a fluoride ion, a chloride ion, a bromide ion, an iodide ion, an acetate ion, a nitrate ion, a hydrogen sulfate ion, a phosphate ion, a dicyanamide ion, $BF_4^-$, $PF_6^-$, $CF_3COO^-$, $CF_3SO_3^-$, $SCN^-$, $(CF_3SO_2)_3C^-$, a bis(trifluoromethoxysulfonyl)imide ion, a bis(trifluoromethoxysulfonyl)imide ion, a bis(perfluoroethylsulfonyl)imide ion, and so on. The anion of the ionic liquid can be a single or a combination of several anions. Further, it is possible to use a dipolar ion made by coupling the cation and the anion in the ionic liquid by hydrocarbon. One of the above ionic liquids may be used alone, or two or more may be used in combination.

The oxidation electrode 15 is arranged in the second reaction tank 3 to which the electrolytic solution is further supplied. At the oxidation electrode 15, $H_2O$ is oxidized to produce $O_2$ and $H^+$ when a hydrogen ion concentration in the electrolytic solution is 7 or less (pH≤7). On the other hand, when the hydrogen ion concentration in the electrolytic solution is larger than 7 (pH>7), $OH^-$ is oxidized to produce $O_2$ and $H_2O$. The oxidation electrode 15 is constituted by a material that decreases activation energy for causing the oxidation reaction. In other words, the oxidation electrode 15 is constituted by a material that decreases overvoltage when causing a reaction of oxidizing $H_2O$ or $OH^-$ to draw electrons. Examples of the constituting material of the oxidation electrode 15 include platinum, binary metal oxides such as manganese oxide (Mn—O), iridium oxide (Ir—O), nickel oxide (Ni—O), cobalt oxide (Co—O), iron oxide (Fe—O), tin oxide (Sn—O), indium oxide (In—O), and ruthenium oxide (Ru—O), ternary metal oxides such as Ni—Co—O, La—Co—O, Ni—La—O, Sr—Fe—O, quaternary metal oxides such as Pb—Ru—Ir—O, La—Sr—Co—O, and a metal complex such as a Ru complex or a Fe complex.

In the first reaction tank 2, the reduction electrode 14 is arranged as described above to which nitrogen gas is further supplied. In carrying out the reduction reaction, the reduction electrode 14 is preferably constituted by an electrode material having conductivity. Further, the reduction electrode 14 preferably has a porous structure because a reaction area can be increased by gas diffusion. Concretely, the reduction electrode 14 preferably has a gas diffusion layer and a catalyst layer. For example, carbon paper, carbon cloth, carbon felt, and so on are used for the gas diffusion layer. The catalyst layer contains a porous carbon material (particles) as a catalyst support and a polymer material that binds the porous carbon material as the catalyst support, in addition to the reduction catalyst that reduces nitrogen to produce ammonia.

The reduction catalyst (ammonia-producing catalyst) used in the reduction electrode 14 is one that promotes the production of ammonia from nitrogen and, for example, a molybdenum complex is used, but not limited thereto. The ammonia-producing catalysts include, for example, the molybdenum complexes (A) through (D) listed below.

A first example includes (A) a molybdenum complex having N,N-bis(dialkylphosphinomethyl)dihydrobenzimidazolidene (where two alkyl groups may be the same or different and at least one hydrogen atom of a benzene ring may be substituted with an alkyl group, an alkoxy group, or a halogen atom) as a PCP ligand.

A second example includes (B) a molybdenum complex having 2,6-bis(dialkylphosphinomethyl)pyridine (where two alkyl groups may be the same or different and at least one hydrogen atom of a pyridine ring may be substituted with an alkyl group, an alkoxy group, or a halogen atom) as a PNP ligand.

A third example includes (C) a molybdenum complex having bis(dialkylphosphinomethyl)arylphosphine (where two alkyl groups may be the same or different) as a PPP ligand.

A fourth example includes (D) a molybdenum complex expressed by trans-$Mo(N_2)_2(R1R2R3P)_4$ (where R1, R2, R3 are alkyl groups or aryl groups that may be the same or different, and two R3s may couple with each other to form an alkylene chain).

In the above molybdenum complexes, the alkyl group may be, for example, a methyl group, an ethyl group, a propyl group, a butyl group, a pentyl group, a hexyl group, or the like, and a straight-chain or branched-chain alkyl group of their structural isomers, or a cyclic alkyl group such as a cyclopropyl group, a cyclobutyl group, a cyclopentyl group, or a cyclohexyl group. The carbon number of the alkyl group is preferably 1 to 12, and more preferably 1 to 6. The alkoxy group may be, for example, a methoxy group, an ethoxy group, a propoxy group, a butoxy group, a pentoxy group, a hexyloxy, and a straight-chain or branched-chain alkoxy group of their structural isomers, or a cyclic alkoxy group such as a cyclopropoxy group, a cyclobutoxy group, a cyclopentoxy group, or a cyclohexyloxy group. The carbon number of the alkoxy group is preferably 1 to 12, and more preferably 1 to 6. Examples of the halogen atom include a fluorine atom, a chlorine atom, a bromine atom, an iodine atom, and so on.

The molybdenum complex of (A) includes a molybdenum complex expressed, for example, by Formula (A1) below.

(A1)

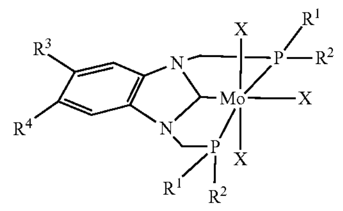

In the formula, R1 and R2 are alkyl groups that may be the same or different, and X is an iodine atom, a bromine atom, or a chlorine atom, and at least one hydrogen atom on the benzene ring may be substituted with an alkyl group, an alkoxy group, or a halogen atom.

Examples of the alkyl group, the alkoxy group, and the halogen atom include the same as those already exemplified. R1 and R2 are each preferably a bulky alkyl group (for example, a tert-butyl group or an isopropyl group). The hydrogen atom on the benzene ring is preferably not substituted, or the 5-position or 6-position hydrogen atom is substituted with a 1-12C chain, cyclic, or branched alkyl group.

Examples of the molybdenum complex of (B) include molybdenum complexes expressed, for example, by Formula (B1), Formula (B2), and Formula (B3) below.

(B1)

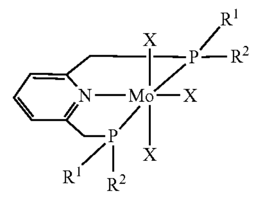

-continued (B2)

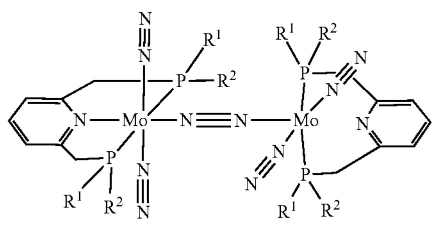

(B3)

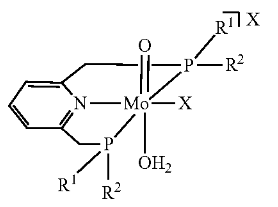

In the formula, R1 and R2 are alkyl groups that may be the same or different, and X is an iodine atom, a bromine atom, or a chlorine atom, and at least one hydrogen atom on the pyridine ring may be substituted with an alkyl group, an alkoxy group, or a halogen atom.

Examples of the alkyl group, the alkoxy group, and the halogen atom include the same as those already exemplified. R1 and R2 are each preferably a bulky alkyl group (for example, a tert-butyl group or an isopropyl group). The hydrogen atom on the pyridine ring is preferably not substituted, or the 4-position hydrogen atom is substituted with a 1-12C chain, cyclic, or branched alkyl group.

The molybdenum complex of (C) includes a molybdenum complex expressed, for example, by Formula (C1) below.

(C1)

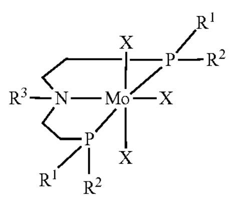

In the formula, R1 and R2 are alkyl groups that may be the same or different, R3 is an aryl group, and X is an iodine atom, a bromine atom, or a chlorine atom.

Examples of the alkyl group include the same as those already exemplified. Examples of the aryl group include a phenyl group, a tolyl group, a xylyl group, a naphthyl group, and those each having at least one of cyclic hydrogen atoms substituted with an alkyl group or a halogen atom. Examples of the alkyl group and the halogen atom include the same as those already exemplified. R1 and R2 are each preferably a bulky alkyl group (for example, a tert-butyl group or an isopropyl group). R3 is preferably a phenyl group, for example.

Examples of the molybdenum complex of (D) include molybdenum complexes expressed, for example, by Formula (D1) and Formula (D2) below.

(D1)

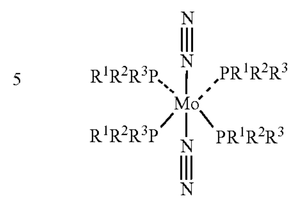

(D2)

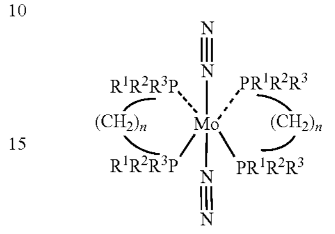

In the formula, R1, R2, and R3 are alkyl groups or aryl groups that may be the same or different, and n is 2 or 3.

Examples of the alkyl group and the aryl group include the same as those already exemplified. In Formula (D1), it is preferable that R1 and R2 are aryl groups (for example, phenyl groups) and R3 is a 1-4C alkyl group (for example, a methyl group) or that R1 and R2 are 1-4C alkyl groups (for example, methyl groups) and R3 is an aryl group (for example, a phenyl group). In Formula (D2), it is preferable that R1 and R2 are aryl groups (for example, phenyl groups) and n is 2.

The ammonia-producing catalyst (reduction catalyst) that promotes the production of ammonia from nitrogen may be, for example, a metallocene complex expressed by Formula (E1) below.

(E1)

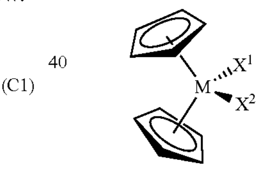

In the formula, M is a tetravalent metal ion and is any of titanium, zirconium, and hafnium. X1 and X2 are the same or different anions with coordination properties. The anion is preferably $Cl^-$, $Br^-$, $I^-$, $CH_3^-$, or $OH^-$, and more preferably $Cl^-$. Concretely, metallocene complexes such as bis(cyclopentadienyl)titanium dichloride and bis(cyclopentadienyl) zirconium dichloride are preferred.

In addition, metal catalysts such as molybdenum, bismuth, iron, rhodium, ruthenium, titanium, and zirconium may be used as the ammonia-producing catalysts (reduction catalysts). One of these may be used alone, or two or more may be used in combination.

The catalyst support supports the ammonia-producing catalyst (reduction catalyst) and is made of a porous carbon material. Examples of the porous carbon material (carbon particles) include channel black, furnace black, thermal black, acetylene black, activated carbon, natural graphite, artificial graphite, graphitized carbon, graphene, carbon nanotubes (CNT), fullerene, Ketjen black, glassy carbon, and so on. Among these materials, the porous carbon materials with a BET average pore size of 1 nm or more and 15 nm or less can be used. The porous carbon material with the BET average pore size of 1 nm or more and 15 nm or less as the catalyst support enables to densely and efficiently fix a molecular catalyst such as the molybdenum complex described above to the electrode. Thus, it is possible to obtain a three-phase interface-controlled reduction electrode 14 that is capable of direct reaction of nitrogen ($N_2$). This can significantly increase the production efficiency of ammonia by a gas phase.

When the BET average pore size of the porous carbon material exceeds 15 nm, the pore size is too large to efficiently hold the molecular catalyst such as the molybdenum complex. On the other hand, when the BET average pore size of the porous carbon material is less than 1 nm, the pores are too small to hold the molecular catalyst such as the molybdenum complex at high density. In any case, the function of the ammonia-producing catalyst (reduction catalyst) in the reduction electrode 14 cannot be sufficiently enhanced, and gaseous $N_2$ cannot be reduced efficiently. The BET average pore size of the porous carbon material is more preferably 2 nm or more and 10 nm or less.

By adsorbing and holding the ammonia-producing catalyst in the pores of the porous carbon material having the BET average pore size as described above, it is possible to use the ammonia-producing catalyst for the nitrogen reduction reaction as the catalyst support. For example, when the ammonia-producing catalyst is the molybdenum complex, by bringing the porous carbon particles into contact with a solution in which the molybdenum complex is dissolved, the molybdenum complex is attracted to the porous carbon particles by attraction (Van der Waals force) from the porous carbon particles, causing adsorption to the pores of the porous carbon particles. Properties of the porous carbon material that can suitably hold the ammonia-producing catalyst include the BET average pore size as described above. A specific surface area of the porous carbon material is preferably 800 $m^2/g$ or more and 2000 $m^2/g$ or less to increase the reaction area. Furthermore, an average pore volume of the porous carbon material is preferably 0.2 $cm^3/g$ or more and 5 $cm^3/g$ or less to increase the holding amount of the catalyst.

Among the various carbon materials mentioned above, activated carbon is a carbon material with a well-developed pore structure, large specific surface area, and adsorption performance, and is the preferred support for the ammonia-producing catalyst because it can easily satisfy the BET average pore size mentioned above. Activated carbon is manufactured by carbonizing plant-based materials (wood, charcoal, coconut shells, and so on) or mineral-based materials (coke, coal tar, coal pitch, and so on), followed by activation treatment with water vapor or an alkaline solution such as potassium hydroxide.

Properties of activated carbon can be evaluated by a gas adsorption method using a specific surface area and pore size distribution measuring device. To measure the specific surface area and the pore size distribution, reversibly adsorbing inert gas (adsorbate) such as nitrogen, argon, or krypton is used. In measurement operation, a sample is placed in a sample tube of known volume, the sample is heated and vacuum dried to remove extraneous matters, and a fixed amount of adsorbate is introduced into the sample tube to bring the adsorbate in contact with a sample surface. An adsorbent amount increases with time, and eventually, there is no increase in the adsorbent amount. A state at this time is called an adsorption equilibrium state, the adsorption amount is called an equilibrium adsorption amount, and a pressure is called an equilibrium pressure. The adsorption amount is determined by measuring a change in pressure until the adsorption equilibrium state is reached.

Regarding the specific surface area, the amount of a first layer of the adsorption is calculated from the amount of adsorbate adsorbed on the sample surface by BET theory, and the area occupied by one molecule of the adsorbate is used to obtain a specific surface area value. Pore volume and pore distribution are analyzed by dividing into a micropore region (pore diameter of 2.0 nm or less) and a mesopore region (pore diameter of larger than 2.0 nm and 50 nm or less). The micropore region is analyzed by a t method, while the mesopore region is analyzed by a BJH method. The t method analyzes the volume and pore size of the micropore region by converting and comparing amounts of adsorbate adsorbed on a non-porous sample and on a measured sample in terms of the thickness of an adsorption layer (t). In the mesopore region, a liquefaction phenomenon (capillary condensation) of adsorbate molecules in the pore proceeds at a certain relative pressure, and the BJH method analyzes the amount of adsorbate liquefied in the pore from a change in the pressure and the adsorption amount. In the BJH method, since the pressure can be converted to the pore size using the Kelvin equation, the pore distribution can be obtained along with the pore volume.

Solubility of the molecular catalyst such as the molybdenum complex in a solvent affects difficulty of adsorption on the pores of activated carbon and other materials. Examples of the solvent to dissolve the molybdenum complex include methanol, ethanol, 1-propanol, 2-propanol, hexafluoro-2-propanol, tetrahydrofuran, acetone, acetonitrile, chloroform, and so on. Among these, methanol is preferably used due to its low boiling point, high solubility, and other properties. The temperature at which the molybdenum complex is adsorbed on activated carbon is preferably 0 to 90° C., and even more preferably 5 to 40° C., taking into consideration the decomposition temperature of the molybdenum complex and the boiling point of the solvent. When the time for adsorption of the molybdenum complex on activated carbon is short, adsorption may not be completed. On the other hand, when the adsorption time is too long, workability will deteriorate. Therefore, the time for adsorption of the molybdenum complex on activated carbon is preferably in a range of 30 minutes to 48 hours, and furthermore, 1 hour to 24 hours is desirable.

The polymer material used to bind the catalyst support is desirably a non-water soluble polymer material that can maintain a catalyst layer structure in a wet environment. Examples of such polymer materials include perfluoroalkoxyalkane (PFA), perfluoroethylene-propene copolymer (FEP), polytetrafluoroethylene (PTFE), ethylene-tetrafluoroethylene copolymer (ETFE), polyvinylidene fluoride (PVDF), polychlorotrifluoroethylene (PCTFE), ethylene-chlorotrifluoroethylene copolymer (ECTFE) and other fluorinated resins, polystyrene, polyvinyl butyral, poly(4-vinylpyridine), and so on. Examples of ion-conductive polymer materials include, for example, Nafion (registered trademark) being fluorocarbon resin made by sulfonating and polymerizing tetrafluoroethylene of DuPont Inc., Sustainion (registered trademark) of Dioxide Materials Inc., PiperION (registered trademark) of Versogen Inc., and others.

The catalyst layer may contain the ionic liquid. The ionic liquid on a catalyst support surface of the catalyst layer has effects of decreasing hydrogen generation due to water reduction and promoting an ammonia production reaction by inhibiting adhesion of excess water. The ionic liquid to be contained in the reduction catalyst 14 can be the same as that used in the electrolytic solution described above.

For the diaphragm 4, a membrane capable of selectively allowing anions or cations to flow is used. As the diaphragm 4, for example, an ion exchange membrane such as NEOSEPTA (registered trademark) of ASTOM Corporation, Selemion (registered trademark) of Asahi Glass Co., Ltd., Aciplex (registered trademark) of Asahi Kasei Corp., Fumasep (registered trademark) and fumapem (registered trademark) of Fumatech GmbH, Nafion (registered trademark) being fluorocarbon resin made by sulfonating and polymerizing tetrafluoroethylene of DuPont Inc., lewabrane (registered trademark) of LANXESS Co. Ltd., IONSEP (registered trademark) of IONTECH Inc., Mustang (registered trademark) of PALL Corp., ralex (registered trademark) of mega Corp., Gore-Tex (registered trademark) of Gore-Tex Inc., Sustainion (registered trademark) of Dioxide Materials Inc., PiperION (registered trademark) of Versogen Inc., or the like can be used. Anion exchange membranes are preferred because of their advantage in increasing the ammonia production amount.

For the diaphragm 4, for example, a silicone resin, fluorine-based resins such as perfluoroalkoxyalkane (PFA), perfluoroethylene propene copolymer (FEP), polytetrafluoroethylene (PTFE), ethylene-tetrafluoroethylene copolymer (ETFE), polyvinylidene fluoride (PVDF), polychlorotrifluoroethylene (PCTFE), and ethylene-chlorotrifluoroethylene copolymer (ECTFE), ceramic porous membranes, packing filled with a glass filter or agar, insulating porous bodies such as zeolite and oxide can be used in addition to the ion exchange membrane. A hydrophilic porous membrane never causes clogging due to air bubbles and is therefore preferably used as the diaphragm 4.

In the ammonia manufacturing apparatus 1 illustrated in FIG. 1, the nitrogen supply unit 7 is a unit that supplies gaseous nitrogen to the first reaction tank (reduction reaction electrolytic bath) 2 and includes the nitrogen supplier 6. As the nitrogen to be supplied from the nitrogen supplier 6, for example, nitrogen in the air is used, but not limited thereto. Since about 21% of oxygen is contained in the air, it is preferable to separate oxygen in advance and then take out nitrogen. In the case of using nitrogen in the air, an oxygen separator that separates oxygen in the air and then takes out nitrogen is used for the nitrogen supplier 6. As a separation method of oxygen in the air in the oxygen separator 6, for example, the cryogenic distillation method of separating oxygen by utilizing a difference in boiling points, the adsorption separation method utilizing a difference in adsorbing characteristics with respect to gas molecules of a zeolite-based adsorbent, the membrane separation method of separating oxygen by utilizing the fact that the speed of permeating a membrane differs depending on gas molecules, or the like is used and can be appropriately selected according to the cost and apparatus scale, and the separation method is not limited. The nitrogen supply unit 7 further includes a humidifier 18 that humidifies nitrogen taken out of the air. It is preferable to supply humidified nitrogen to the first reaction tank 2.

Nitrogen gas containing ammonia is discharged from the first reaction tank 2. A discharge pipe of the first reaction tank 2 is connected to the ammonia collection unit 9. The ammonia collection unit 9 is a unit that collects ammonia contained in the gas discharged from the first reaction tank 2 and includes the ammonia collector 8. The ammonia collector 8 is not limited, and for example, a device that selectively collects ammonia by bringing exhaust gas into contact with an aqueous solution (collection solution) with a pH of 7 or less to absorb ammonia is used. Such an ammonia collector 8 can simultaneously separate byproduct hydrogen and unreacted nitrogen contained in the exhaust gas.

The ammonia collected by the ammonia collector 8 is contained in the collection solution and is sent to a first separator 19, which separates ammonia from the collection solution. The first ammonia separator 19 uses, for example, the distillation method or the cryogenic distillation method of separating ammonia by utilizing the difference in boiling points, the adsorption separation method utilizing the difference in adsorbing characteristics with respect to gas molecules of the zeolite-based adsorbent, the membrane separation method of separating ammonia by utilizing the fact that the speed of permeating the membrane differs depending on the gas molecules, or the like. The first ammonia separator 19 can be selected according to the cost and apparatus scale and is not limited. The first ammonia separator 19 is provided with a pipe to recover the ammonia separated from the collection solution.

In the case of separating ammonia from the collection solution by distillation, a distillation column is used as the first ammonia separator 19. The distillation column is configured to separate ammonia having the boiling point lower than that of water used as at least part of the collection solution. In the distillation column, ammonia is separated by distillation by the conventional method from the supplied collection solution. Concretely, ammonia is discharged from a pipe at a column top part of the distillation column by subjecting the collection solution to reduced-pressure distillation under a reduced pressure of 10 Torr or more and 120 Torr or less (1333 Pa or more and 15999 Pa or less). The ammonia discharged from the pipe is recovered into a not-illustrated tank or the like.

For the separation of ammonia, the stripping method of bringing the collection solution into contact with vapor and moving the ammonia in the collection solution to the vapor to recover the ammonia may be used. In this case, the first ammonia separator 19 includes a stripping column whose inside is partitioned by a porous plate and is configured to make the supplied collection solution flow from an upper tier to a lower tier of the stripping column. The vapor flows from the lower tier to the upper tier and rises in the solution dammed by the porous plate. Due to the contact of the collection solution with the vapor, the ammonia in the collection solution vaporizes and moves into the vapor and is thereby discharged from the pipe at the column top part. When a carbonate aqueous solution is used as the collection solution, the ammonia in the collection solution can be converted to ammonium hydrogen carbonate, which can be pyrolyzed by a pyrolyzer to separate and recover ammonia and carbon dioxide.

The second reaction tank 3 is connected to the electrolytic solution circulation unit 13. The electrolytic solution circulation unit 13 is a unit that circulates the electrolytic solution in the circulation pipe 12 so that the electrolytic solution containing produced ammonia is taken from the second reaction tank 3 to the outside and the electrolytic solution is supplied back to the second reaction tank 3. The circulation pipe 12 is provided with a liquid feed pump 20 for circulating the electrolytic solution and an electrolytic solution storage tank 21 for storing the electrolytic solution and regulating the electrolyte concentration, pH, and so on. The electrolytic solution circulation unit 13 is configured to circulate the electrolytic solution between the second reaction tank 3 and the electrolytic solution storage tank 21 by the liquid feed pump 20.

Though the liquid feed pump 20 is provided in the circulation pipe 12, which sends the electrolytic solution from the electrolytic solution storage tank 21 to the second reaction tank 3 in FIG. 1, the liquid feed pump 20 may be provided in the circulation pipe 12, which sends the electrolytic solution from the second reaction tank 3 to the electrolytic solution storage tank 21. The electrolytic solution circulation unit 13 preferably includes an exhaust unit, which exhausts excessive nitrogen that has not dissolved in the electrolytic solution and gas that has been generated by the oxidation-reduction reaction. As the exhaust unit, for example, a pipe provided with a valve is used and is provided, for example, in the electrolytic solution storage tank 21. The electrolytic solution storage tank 21 functions as a gas-liquid separation tank, where oxygen ($O_2$) generated by the oxidation reaction is separated from the electrolytic solution.

The ammonia separation unit 11 is a unit that recovers ammonia ($NH_3$), which is a reduced substance of nitrogen, from the electrolytic solution. The ammonia separation unit 11 includes the ammonia separation part 10 that separates ammonia from the electrolytic solution, a three-way valve 22 that takes out at least part of the electrolytic solution circulating in the circulation pipe 12, a pipe 23 that sends the electrolytic solution taken out of the three-way valve 22 to the second separator 10, and a pipe 24 that sends the electrolytic solution from which ammonia has been separated in the second separator 10 to the electrolytic solution storage tank 21. The three-way valve 22 is provided in the circulation pipe 12, and the ammonia separation unit 11 is connected to the electrolytic solution circulation unit 13 through the three-way valve 22. The taking-out of the electrolytic solution circulating in the circulation pipe 12 may be implemented not by using the three-way valve 22 provided in the circulation pipe 12 but by connecting a pipe having a valve to the electrolytic solution storage tank 21 and its configuration is not limited. The second ammonia separator 10 uses a similar separation method as the first ammonia separator 19 and has a similar configuration. The second ammonia separator 10 can be applied the same configuration as in the first ammonia separator 19, except that ammonia is separated from the electrolytic solution instead of the collection solution.

Next, an ammonia manufacturing process using the above ammonia manufacturing apparatus 1 will be described. First, as an initial stage, humidified nitrogen gas is supplied to the first reaction tank 2. The electrolytic solution is supplied to the second reaction tank 3 through the circulation pipe 12. In this state, electric power is applied to the reduction electrode 14 and the oxidation electrode 15 from the external electrode 17.

The external electrode 17 may be an ordinary commercial power supply, a battery, or the like, or a power supply that converts renewable energy to electric energy and supplies it. Examples of the power supply include a power supply that converts kinetic energy or potential energy such as wind power, water power, geothermal power, or tidal power into electric energy, a power supply such as a solar cell having a photoelectric conversion element that converts light energy into electric energy, a power supply such as a fuel cell or a storage battery that converts chemical energy into electric energy, an apparatus that converts vibrational energy such as sound into electric energy, and so on. The photoelectric conversion element has a function of performing charge separation by energy of emitted light such as sunlight. Examples of the photoelectric conversion element include a pin-junction solar cell, a pn-junction solar cell, an amorphous silicon solar cell, a multijunction solar cell, a single-crystal silicon solar cell, a polycrystalline silicon solar cell, a dye-sensitized solar cell, an organic thin-film solar cell, and the like.

By supplying electric power from the external electrode 17 to the reduction electrode 14 and the oxidation electrode 15, an oxidation reaction of water ($H_2O$) or hydroxide ions ($OH^-$) in the electrolytic solution electrochemically occurs at the oxidation electrode 15. For example, when the hydrogen ion concentration in the electrolytic solution is 7 or less (pH≤7), $H_2O$ is oxidized to produce $O_2$ and $H^+$ based on Formula (1) below. When the hydrogen ion concentration in the electrolytic solution is larger than 7 (pH>7), $OH^-$ is oxidized to produce $O_2$ and $H_2O$ based on Formula (2) below.

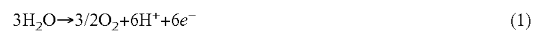

$$3H_2O \rightarrow 3/2O_2+6H^++6e^- \quad (1)$$

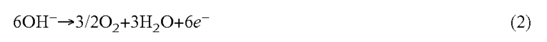

$$6OH^- \rightarrow 3/2O_2+3H_2O+6e^- \quad (2)$$

In the first reaction tank 2, nitrogen ($N_2$) is reduced by the ammonia-producing catalyst to produce ammonia ($NH_3$). The ammonia-producing catalyst is as described above. $N_2$ is reduced by conducting ion species in the diaphragm 4 to produce ammonia ($NH_3$) based on Formula (3) or Formula (4) below.

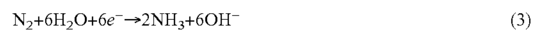

$$N_2+6H_2O+6e^- \rightarrow 2NH_3+6OH^- \quad (3)$$

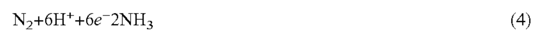

$$N_2+6H^++6e^-2NH_3 \quad (4)$$

The gas containing $NH_3$ produced by the $N_2$ reduction described above is sent to the collector 8 through a pipe, where ammonia is selectively collected by bringing the exhaust gas into contact with the aqueous solution (collection solution) with the pH of 0 to 7, as described above. At the same time, the byproduct hydrogen and unreacted nitrogen contained in the exhaust gas are separated. The collection solution containing ammonia is sent to the first ammonia separator 19, where ammonia is separated from the collection solution.

Part of $NH_3$ produced by the $N_2$ reduction is sent to the second reaction tank 3 through the diaphragm 4 and dissolved in the electrolytic solution. The electrolytic solution containing $NH_3$ is sent to the electrolytic solution storage tank 21 through the circulation pipe 12, where oxygen ($O_2$) is separated, and then sent back to the second reaction tank 3. By circulating the electrolytic solution in the circulation pipe 12, an ammonia concentration in the electrolytic solution increases. By sending at least part of the electrolytic solution with increased ammonia concentration to the second ammonia separator 10 through the three-way valve 22, ammonia is separated from the electrolytic solution.

The supply of the electrolytic solution containing ammonia to the second ammonia separator 10 may be performed continuously from the start of operation of the apparatus but is preferably intermittently performed at the point in time when the concentration of ammonia contained in the electrolytic solution becomes high enough. When the concentration of ammonia contained in the electrolytic solution is low, the energy to be input to recover ammonia from the electrolytic solution becomes larger than the energy amount stored in ammonia and thereby may increase the manufacturing cost of ammonia. Regarding this point, the electrolytic solution is circulated by the circulation pipe 12 through the second reaction tank 3 and the electrolytic solution storage tank 21, so that the electrolytic solution containing ammonia at high concentration can be obtained. It is preferable to send the electrolytic solution containing ammonia at high concentration to the second ammonia separator 10. This makes it possible to recover ammonia being a reduction product of $N_2$ with high efficiency. To improve the recovery efficiency of ammonia, it is preferable to send the electrolytic solution containing ammonia at a concentration of 0.01 mass % or more and 50 mass % or less to the ammonia separator 10.

In the oxidation-reduction reaction in the electrolysis cell 5 described above, the electrolytic solution sent to the second reaction tank 3 is preferably an alkaline solution with the pH larger than 7 and 14 or less, as described above. This allows $OH^-$ to be a carrier ion as a reaction system. This makes it possible to efficiently recover the produced ammonia.

Next, an additional configuration example, modification example, or other examples of the ammonia manufacturing apparatus 1 of the embodiment will be described. The second reaction tank 3 may be provided with a circulation mechanism such as a pump. By promoting the circulation of the electrolytic solution by the circulation mechanism, the circulation of ions ($H^+$ and $OH^-$) between the second reaction tank 3 for oxidation reaction and the first reaction tank 2 for reduction reaction can be improved. The first and second reaction tanks 2, 3 may be provided with flow paths and may be provided with a plurality of circulation mechanisms. Further, a plurality of (three or more) reaction tank flow paths may be provided to decrease diffusion of ions and to circulate the ions more efficiently. Creating the flow of liquid by the circulation mechanism makes it possible to suppress stay of generated bubbles on electrode surfaces and surfaces of the reaction tanks to promote the reactions.

The first and second reaction tanks 2, 3 may be provided with temperature-regulating mechanisms that regulate the temperature of the electrolytic solution. By controlling the temperature using the temperature-regulating mechanisms, it is possible to control catalytic performance. For example, by making the temperature of a reaction system uniform, the performance of the catalyst can be stabilized. Further, a temperature increase can also be prevented for system stabilization. The reaction temperature in the electrochemical reaction cell 5 can be appropriately selected in a range of 5 to 95° C. in consideration of the electrolytic solution being an aqueous solution, reaction efficiency, and economic efficiency. Preferably, the reaction temperature may be near room temperature (10 to 40° C.).

The electrochemical reaction cell 5 can increase the reaction area and obtain more reaction current by making the electrodes more porous. The electrochemical reaction cell 5 may have an electrode structure with a diaphragm sandwiched between a porous oxidation electrode and a porous reduction electrode. That is, in the electrochemical reaction cell 5 illustrated in FIG. 2, the porous oxidation electrode and the porous reduction electrode are arranged in contact with both surfaces of the diaphragm. The electrolytic solution is supplied to an opposite surface of the porous oxidation electrode from the surface in contact with the diaphragm. The ammonia-producing catalyst is arranged on a surface of the porous reduction electrode in contact with the diaphragm, and nitrogen is supplied to a surface of the porous reduction electrode opposite to the surface in contact with the diaphragm. The electrochemical reaction cell 5 may have a nitrogen supply pipe that supplies nitrogen to the ammonia-producing catalyst through the porous reduction electrode and the porous oxidation electrode. A pathway through which nitrogen is distributed may be provided with flow paths. By providing a plurality of (three or more) gas flow paths, nitrogen can be distributed uniformly to the porous reduction electrode.

The electrochemical reaction cell 5 may have the electrolytic solution between the porous reduction electrode and the diaphragm. That is, the electrochemical reaction cell 5 illustrated in FIG. 3 can be supplied with nitrogen from the opposite surface of the reduction electrode 14 from the ammonia-producing catalyst. Thus, the structure of the electrochemical reaction cell 5 can be modified in various ways.

EXAMPLES

Next, examples and their evaluation results are described.

Example 1

[Preparation of Cathode]

The cathode was prepared by spray coating of catalyst ink on carbon paper with a carbon particle layer (MPL layer). The catalyst ink used for the cathode was prepared using activated carbon A (BET average pore size: 3.37 nm, specific surface area: 1300 $m^2/g$, pore capacity: 0.36 $cm^2/g$) as a support for the molybdenum complex, Sustainion (registered trademark) of Dioxide Materials Inc. being an anion exchange resin as ionomer, and 2-propanol as a dispersion medium. The catalyst ink was prepared by mixing activated carbon, ionomer, and 2-propanol in a glass vial bottle and dispersing for 20 minutes using an ultrasonic homogenizer. Next, a catalyst layer was formed by spray coating the catalyst ink to carbon paper (MB-30 (product name), manufactured by Avcarb Co., Ltd.), which is fixed to a metal plate and heated to 90° C. The catalyst layer was coated on the MPL layer side. Amounts of activated carbon and ionomer per 1 $cm^2$ of the coated surface were 0.7 mg and 0.08 mg, respectively. Next, the electrode with the catalyst layer was immersed in a catalyst solution (a solution in which 1 mg of molybdenum complex was dissolved in 10 mL of methanol) in which a molybdenum triiodide complex (as ligand, 1,3-bis(dittersialbutylphosphinomethylbenzoimidazol-2-ylidene), being a PCP ligand) was dissolved in methanol for 1 hour at room temperature in an argon atmosphere. The electrode was then air-dried under argon flow to form a cathode (20 mm×20 mm square). The activated carbon of the cathode adsorbed 0.1 mg of molybdenum complex.

[Preparation of Anode]

The anode was made of Ti in a mesh structure by an etching method, and iridium oxide was formed as an oxidation catalyst on a wire mesh (20 mm×20 mm square) with an increased surface area.

[Preparation of Membrane Electrode Assembly and $N_2$ Electrolysis Cell]

A membrane electrode assembly (catalyst area: 400 $mm^2$) was prepared by stacking one formed by the anode and the cathode, sandwiching a Sustainion (registered trademark) membrane (25 mm×25 mm square) of Dioxide Materials Inc. as the diaphragm. A cathode catalyst layer and an anion exchange membrane were placed in contact with each other. The membrane electrode assembly was sandwiched between titanium flow paths (serpentine, 0.4 mm land width, 1.5 mm flow path width, 1 mm flow path depth) through a Teflon (registered trademark) gasket to assemble the $N_2$ electrolysis cell.

[Constant Potential Electrolysis Measurement (Ammonia Production Experiment)]

A 0.1 M potassium sulfate solution was supplied to an anode flow path of the $N_2$ electrolysis cell at 1 mL/min as the electrolytic solution. The pH of the electrolytic solution was 7. On the other hand, 100% $N_2$ gas saturated and humidified at room temperature was supplied to a cathode flow path at 40 mL/min. A power supply (Solar TRON Cell Test System, manufactured by TOYO Corporation) was connected from outside the cathode and anode flow paths, and a voltage of 3.0 V was applied for 1 hour. Reduction products generated from the cathode of the $N_2$ electrolysis cell were analyzed. Liquid and gas discharged from the cathode flow path were collected in a 10 mM sulfuric acid solution as an ammonia collection solution, and ammonia was quantified. In addition, gas was sampled after ammonia collection and hydrogen was quantified by gas chromatography (Micro GC CP4900, manufactured by Varian Medical Systems Inc.).

[Ammonia Quantification Method (Indophenol Method)]

Quantification of ammonia was performed by an indophenol method. An analytical procedure of the indophenol method is shown below. After adding 5 ml of coloring solution (1) (5 g of phenol and 25 mg of sodium nitroprusside ($Na_2[Fe(CN)_5(NO)]\cdot 2H_2O$) were added to make 500 ml of pure water) to 2.5 ml of ammonia collection solution and mixing, 5 ml of coloring solution (2) (2.5 g of sodium hydroxide and 4.2 ml of sodium hypochlorite were added to make 500 ml of pure water) was added and mixed. The solution was allowed to stand at room temperature for 30 minutes or more. The solution was measured in an ultraviolet-visible absorption spectrophotometer (UV-2500PC, manufactured by Shimadzu Corporation) to determine absorbance due to indophenol derivatives at around 640 nm, and ammonia was quantified.

Faraday efficiency was calculated based on the current consumed for the cathode reduction reaction and quantitative analysis of the reduction products. The Faraday efficiency is expressed as a percentage of the amount of electricity required to produce the reduction products relative to the amount of electricity input. The Faraday efficiency of each reduction product analyzed was used as product selectivity (%). In the $N_2$ electrolysis cell prepared by the above method, the selectivity of ammonia was 0.15%.

Example 2

The $N_2$ electrolysis cell was prepared in the same manner as in Example 1, except that activated carbon A used for the cathode was replaced with activated carbon B (BET average pore size: 1.57 nm, specific surface area: 1350 $m^2/g$, pore capacity: 0.35 $cm^2/g$). Using this $N_2$ electrolysis cell, the manufacturing of ammonia was attempted in the same manner as in Example 1. As a result, the selectivity of ammonia was 0.08%.

Example 3

The $N_2$ electrolysis cell was prepared in the same manner as in Example 1, except that activated carbon A used for the cathode was replaced with activated carbon C (BET average pore size: 9.1 nm, specific surface area: 1250 $m^2/g$, pore capacity: 0.33 $cm^2/g$). Using this $N_2$ electrolysis cell, the manufacturing of ammonia was attempted in the same manner as in Example 1. As a result, the selectivity of ammonia was 0.12%.

Comparative Example 1

The $N_2$ electrolysis cell was prepared in the same manner as in Example 1, except that activated carbon A used for the cathode was replaced with activated carbon D (BET average pore size: 30 nm, specific surface area: 1100 $m^2/g$, pore capacity: 0.31 $cm^2/g$). Using this $N_2$ electrolysis cell, the manufacturing of ammonia was attempted in the same manner as in Example 1. As a result, the selectivity of ammonia was 0.01%.

According to Examples 1 to 3 and Comparative Example 1, the BET average pore size of activated carbon in which the molybdenum complex is suitably held is 1 to 15 nm, and more preferably 2 to 10 nm.

Example 4

The $N_2$ electrolysis cell was prepared in the same manner as in Example 1, except that the diaphragm used in the membrane electrode assembly was replaced with a porous membrane (hydrophilic treated PTFE membrane manufactured by Sumitomo Electric Industries Ltd., pore size of 0.1 m, thickness of 60 m). Using this $N_2$ electrolysis cell, the manufacturing of ammonia was attempted in the same manner as in Example 1. As a result, the selectivity of ammonia was 0.21%.

Example 5

The $N_2$ electrolysis cell was prepared in the same manner as in Example 1, except that the electrolytic solution supplied to the anode flow path of the $N_2$ electrolysis cell was replaced with 0.1 M 1-ethyl-3-methylimidazolium tetrafluoroborate. Using this $N_2$ electrolysis cell, the manufacturing of ammonia was attempted in the same manner as in Example 1. As a result, the selectivity of ammonia was 0.23%.

Example 6

The cathode prepared in Example 1 was immersed in a 50% methanol solution of 1-hexyl-3-methylimidazolium bis(trifluoromethanesulfonyl)imide for 30 minutes and then air-dried in the air so that the cathode contains the ionic liquid. The manufacturing of ammonia was attempted in the same manner as in Example 1, except that the cathode was replaced with this type of cathode. As a result, the selectivity of ammonia was 0.33%.

Example 7

The $N_2$ electrolysis cell was prepared in the same manner as in Example 1, except that the electrolytic solution supplied to the anode flow path of the $N_2$ electrolysis cell was replaced with 0.1 M potassium carbonate (pH=10). Using this $N_2$ electrolysis cell, the manufacturing of ammonia was attempted in the same manner as in Example 1. As a result, the selectivity of ammonia was 0.17%.

Example 8

The $N_2$ electrolysis cell was prepared in the same manner as in Example 1, except that the electrolytic solution supplied to the anode flow path of the $N_2$ electrolysis cell was replaced with 0.1 M potassium hydroxide (pH=13). Using this $N_2$ electrolysis cell, the manufacturing of ammonia was attempted in the same manner as in Example 1. As a result, the selectivity of ammonia was 0.14%.

Example 9

The $N_2$ electrolysis cell was prepared in the same manner as in Example 1, except that the diaphragm used in the membrane electrode assembly was replaced with a Nafion membrane (N117 membrane immersed in 1M KOH aqueous solution and exchanged with potassium ions). Using this $N_2$ electrolysis cell, the manufacturing of ammonia was attempted in the same manner as in Example 1. As a result, the selectivity of ammonia was 0.41%.

Example 10

The $N_2$ electrolysis cell was prepared in the same manner as in Example 1, except that the ionomer used for the cathode was replaced with PTFE and the electrode was baked at 340° C. for 30 minutes. Using this $N_2$ electrolysis cell, the manufacturing of ammonia was attempted in the same manner as in Example 1. As a result, the selectivity of ammonia was 0.34%.

Note that the configurations of the above-described embodiments are applicable in combination. Further, parts thereof are replaceable. While certain embodiments of the present invention have been described above, these embodiments have been presented by way of example only, and are not intended to limit the scope of the invention. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. An ammonia manufacturing apparatus, comprising:

an electrochemical reaction cell including: a first reaction tank in which a reduction electrode is arranged and gaseous nitrogen is supplied; a second reaction tank in which an oxidation electrode is arranged and an electrolytic solution containing water or water vapor is supplied; and a diaphragm provided between the first reaction tank and the second reaction tank, wherein the reduction electrode includes a reduction catalyst that reduces nitrogen to produce ammonia, a porous carbon material that supports the reduction catalyst, and an organic polymer material that binds the porous carbon material, the porous carbon material has pores with a BET average pore size of 1 nm or more and 15 nm or less, a specific surface area of the porous carbon material is 800 $m^2/g$ or more and 2000 $m^2/g$ or less, and an average pore volume of the porous carbon material is 0.2 $cm^3/g$ or more and 5 $cm^3/g$ or less.

2. The apparatus according to claim 1, wherein the reduction catalyst includes a molybdenum complex.

3. The apparatus according to claim 1, wherein the organic polymer includes an anion exchange resin.

4. The apparatus according to claim 1, wherein the electrolytic solution supplied to the second reaction tank has a pH larger than 7 and 14 or less.

5. An ammonia manufacturing apparatus, comprising:

an electrochemical reaction cell including: a first reaction tank in which a reduction electrode is arranged and gaseous nitrogen is supplied; a second reaction tank in which an oxidation electrode is arranged and an electrolytic solution containing water or water vapor is supplied; and a diaphragm provided between the first reaction tank and the second reaction tank;

a nitrogen supply unit that includes a nitrogen supply part introducing gaseous nitrogen to the first reaction tank;

an ammonia collection unit that includes an ammonia collection part collecting ammonia contained in discharged products of the first reaction tank; and an ammonia separation unit that includes an ammonia separation part separating ammonia from the electrolytic solution discharged from the second reaction tank, wherein the reduction electrode includes a reduction catalyst that reduces nitrogen to produce ammonia, a porous carbon material that supports the reduction catalyst, and an organic polymer material that binds the porous carbon material, and the porous carbon material has pores with a BET average pore size of 1 nm or more and 15 nm or less.

6. The apparatus according to claim 5, further comprising:

an electrolytic solution circulation unit that includes a circulation pipe circulating the electrolytic solution accommodated in the second reaction tank outside the second reaction tank, and an electrolytic solution storage tank that is arranged in the circulation pipe and stores the electrolytic solution.

7. The apparatus according to claim 5, wherein the nitrogen supply unit includes an oxygen separator that separates oxygen in the air and takes out nitrogen and a humidifier that humidifies the separated nitrogen as the nitrogen supply part.

8. The apparatus according to claim 5, wherein the ammonia collection unit includes a collector that collects the ammonia by bringing gas exhausted from the first reaction tank into contact with a collection solution containing an aqueous solution with a pH of 1 or more and 7 or less as the ammonia collection part.

9. The apparatus according to claim 8, wherein the ammonia collection unit further includes a separator that applies a distillation method, a cryogenic distillation method, an adsorption separation method, or a membrane separation method to separate ammonia from the collection solution, which has collected ammonia.

10. An ammonia manufacturing method, comprising:

supplying gaseous nitrogen to a first reaction tank and supplying an electrolytic solution containing water or water vapor to a second reaction tank in an electrochemical reaction cell, the electrochemical reaction cell including: the first reaction tank in which a reduction electrode is arranged; the second reaction tank in which an oxidation electrode is arranged; and a diaphragm provided between the first reaction tank and the second reaction tank;

supplying electric power to the reduction electrode and the oxidation electrode, reducing nitrogen in the first reaction tank by the reduction electrode to produce ammonia, and oxidizing the electrolytic solution or water vapor in the second reaction tank by the oxidation electrode;

separating ammonia from discharged products of the first reaction tank to manufacture ammonia; and circulating the electrolytic solution outside the second reaction tank, taking out at least part of the circulating electrolytic solution, separating ammonia from the taken-out electrolytic solution, and sending the electrolytic solution from which ammonia has been separated to the second reaction tank, wherein the reduction electrode includes a reduction catalyst that reduces nitrogen to produce ammonia, a porous carbon material that supports the reduction catalyst, and an organic polymer material that binds the porous carbon material, and the porous carbon material has pores with a BET average pore size of 1 nm or more and 15 nm or less.

11. The method according to claim 10, wherein the electrolytic solution supplied to the second reaction tank has a pH larger than 7 and 14 or less.

12. The method according to claim 10, wherein the reduction catalyst includes a molybdenum complex.

* * * * *